United States Patent [19]

Takazawa et al.

[11] 4,307,949
[45] Dec. 29, 1981

[54] SHUTTER CONTROL SYSTEM HAVING INFORMATION CIRCUIT FOR INTRODUCING INFORMATIONS FOR FLASH PHOTOGRAPHING

[75] Inventors: Yuzuru Takazawa; Shinji Nagaoka, both of Shikawatashi, Japan

[73] Assignee: Seiko Koki Kabushiki Kaisha, Tokyo, Japan

[21] Appl. No.: 60,020

[22] Filed: Jul. 23, 1979

[30] Foreign Application Priority Data

Aug. 23, 1978 [JP] Japan .................................. 53-102585

[51] Int. Cl.³ .................. G03B 7/083; G03B 7/16; G03B 17/18
[52] U.S. Cl. ............................. 354/51; 354/60 L
[58] Field of Search .................. 354/27–30, 354/32–38, 48, 50, 51, 53, 60 E, 60 F, 60 L, 58, 127, 128, 139, 149, 289

[56] References Cited

U.S. PATENT DOCUMENTS

| | | | |
|---|---|---|---|
| 3,504,604 | 4/1970 | Kitai | 354/51 |
| 3,668,987 | 6/1972 | Hayashi | 354/51 |
| 3,696,721 | 10/1972 | Wagner | 354/60 L X |
| 3,824,606 | 7/1974 | Yoshimura | 354/50 |
| 3,921,184 | 11/1975 | Borowski | 354/51 X |
| 3,987,464 | 10/1976 | Kitai et al. | 354/51 |
| 4,033,682 | 7/1977 | Nakamura et al. | 354/51 X |

*Primary Examiner*—L. T. Hix
*Assistant Examiner*—William B. Perkey
*Attorney, Agent, or Firm*—Robert E. Burns; Emmanuel J. Lobato; Bruce L. Adams

[57] ABSTRACT

In a program shutter of the type in which the aperture opening gradually increases with the lapse of time, informations such as sensitivity of the film and the object distance are introduced by an electric circuit.

The system has a switching circuit for exposure control. The trigger level of the switching circuit is determined in proportion to the film sensitivity and the object distance to vary the exposure control time corresponding to the informations to automatically determine a proper aperture for flash photography.

The system is capable of providing a warning indication prior to the shutter operation if the exposure control time thus obtained is longer than the time during which the aperture is fully opened.

7 Claims, 2 Drawing Figures

SHUTTER CONTROL SYSTEM HAVING INFORMATION CIRCUIT FOR INTRODUCING INFORMATIONS FOR FLASH PHOTOGRAPHING

BACKGROUND OF THE INVENTION

This invention relates generally to a control circuit for an electric program shutter in which the aperture opening gradually increases with the lapse of time and the aperture remains fully opened during the exposure time and more particularly, to a shutter control system capable of introducing exposure information, such as the object distance and the guide number which are necessary for flash photography, to the time control circuit in flash photography using a shutter having a time control circuit capable of controlling the aperture opening. This invention is also capable of providing a non-synchronousness warning by means of an indicator element prior to the shutter operation in the flash photography mode in such cases when the aperture opening calculated using informations such as the object distance and the guide number exceeds the full aperture. In the conventional shutters, the proper aperture opening determined in dependence on the object distance and the guide number is manually adjusted or determined by means of a mechanical interlocking mechanism and, therefore, the conventional shutters require complicated mechanism and parts and have a disadvantage that the non-synchronousness warning by means of an indicator element, such as easily practiced by the present invention, is difficult to achieve in conventional shutters. Accordingly, an object of the present invention is to eliminate the disadvantage of the conventional shutter system by electrically introducing the exposure information for flash photography.

DETAILED DESCRIPTION OF INVENTION

Figure 1:
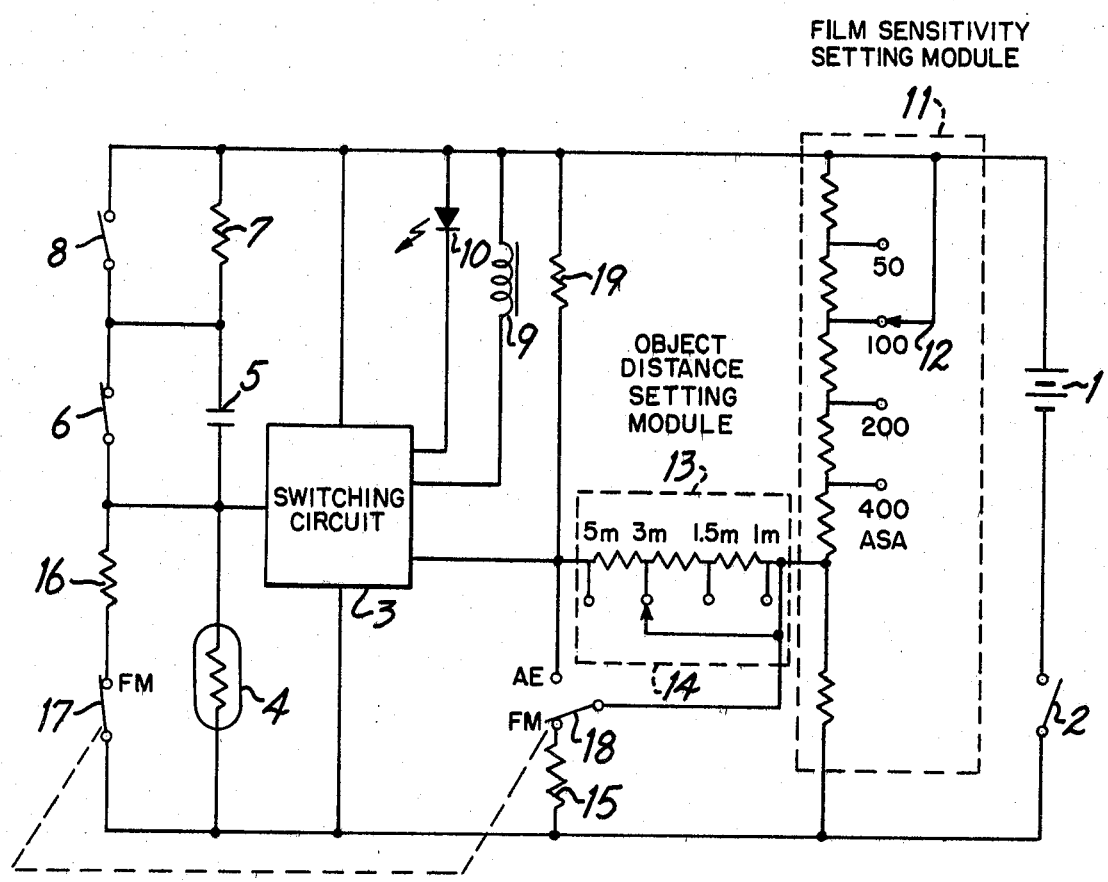
FIG. 1 is a schematic diagram of a shutter control system embodied according to the present invention.

Referring to FIG. 1, the shutter control system comprises a power source (1), a main switch (2), a switching circuit (3), a photoconductive element (4) such as CdS, and a condenser (5) connected to the photoconductive element and forming a time constant circuit, the intermediate point of the connection being connected to the input of the switching circuit (3). A timing switch (6) connected in parallel with the condenser (5) and is normally closed to short-circuit the condenser and opens in interlocking relationship with the shutter opening operation. A comparison resistor (7) for actuating the warning system is connected to a switch (8) to changeover the mode from the warning mode to the shutter control mode. The shutter control system further includes an electromagnet (9) to control the closing of the shutter, a warning indicator element (10), (9) a film sensitivity setting module (11) consisting of a series of resistors and a film sensitivity selecting switch (12), a distance setting module (13) consisting of a series of resistors and a distance setting switch (14), a correction resistor (15), a resistor (16) which is connected to the photoconductive element (4) in the flash photography setting, and a switch (17) for connecting the resistor (16) to the switching circuit and interlocked with a changeover switch (18) which connects or disconnects the distance setting module (13) to the switching circuit. FIG. 1 illustrates the components as set in the flash photography condition.

The manner of operation of the various components described in connection with FIG. 1 will be explained beginning first from the operation in flash photography mode, the principal purpose of the present invention. The switches (17) and (18) are turned to the (FM) side. The switch (12) of the film sensitivity setting module (11) is set at the position corresponding to the sensitivity of the photographic film being used. In this case, the sensitivity of the photographic film is ASA 100. The switch (14) sets the distance setting module (13). In this case the object distance is 3 meters. As the main switch (2) is closed at the initial stage of depression of the shutter release button, the system is charged.

The electromagnet (9) is excited to hold the shutter closing member and the shutter is set ready to start, while the bleeder voltage of the bleeder circuit consisting of the combined resistance of the photoconductive element (4) and the resistor (16) and the comparison resistor (7) is applied to the input of the switching circuit (3). The combination of the film sensitivity setting module (11), the distance setting module (13) and the resistors (15) and (19) determine the trigger level of the switching circuit (3). The trigger level of the switching circuit is higher when the film sensitivity is higher or the object distance is shorter. The warning indicator element (10) lights up when the input voltage is higher compared to the trigger level. The comparison resistor (7) will be adjusted so as to make the lighting-up level agree with the time during which the aperture is fully opened. Therefore, the non-synchronousness warning is provided prior to the shutter operation in case the aperture is to fully open. As the shutter release button is depressed further, the switch (8) is closed to short-circuit the resistor (7) and the warning light is turned off. Subsequently, the shutter performs the opening operation while the timing switch is opened to charge the condenser (5) of the time constant circuit through the photoconductive element (4) and the resistor (16).

Figure 2:
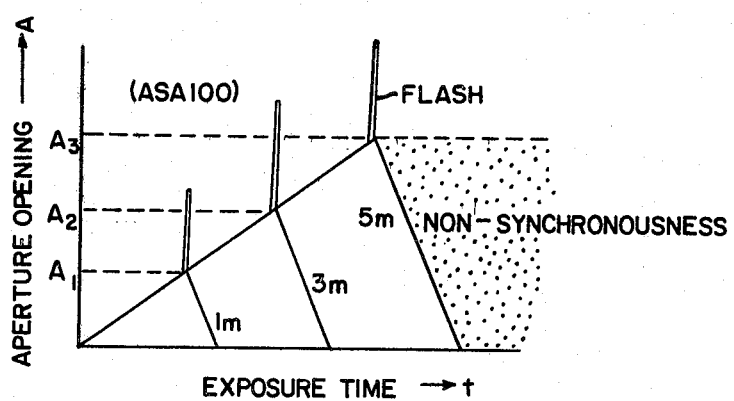
FIG. 2 is an explanatory diagram for explaining the operation of the system according to the invention.

As illustrated by the diagram in FIG. 2, the diameter (A) of the aperture opening increases gradually with the lapse of exposure time. The charging voltage of the condenser (5) of the time constant circuit is applied to the switching circuit (3). When the level of the voltage applied to the switching circuit (3) equals the trigger level determined according to the film sensitivity and the object distance, the switching circuit (3) is inversed to cut off the electromagnet (9) and the shutter is closed. As shown in FIG. 2, the system is adapted to actuate flashing synchronously with initiation of shutter closing operation, therefore, the peak of the flashing is synchronized with maximum aperture opening. The aperture opening is larger for longer object distance as shown by aperture openings A1, A2 and A3 for object distances of 1 meter, 2 meters and 3 meters, respectively. The aperture opening changes similarly with the change of film sensitivity setting.

Explanation will be given as to the function of the system of the present invention in case of AE photography. In this case, the switch (17) is opened and the switch (18) is turned to the AE position. Accordingly, only the photoconductive element (4) is included in the time constant circuit (3) and the object distance setting module (13) is short-circuited by the switch (18) so that the information from the object distance setting module

(13) is not introduced to the time constant circuit (3). The operation of the system in AE photography is similar to that of the system in flash photography. As the shutter release button is depressed, the main switch is closed and the system is set to the camera shake warning mode. In this mode, the bleed voltage of the comparison resistor (7) and the photoconductive element (4) is applied to the switching circuit. The trigger level is set at a voltage corresponding to the film sensitivity. The indicating element (10) gives a warning when the voltage inputted to the switching circuit is higher than the trigger level. The camera shake warning will be given if the warning level is set at a shutter speed of around 1/30 seconds. The shutter provides a proper exposure in the known manner using the specific variation of charging time for the condenser of the time constant circuit in proportion to the variation of the resistance of the photoconductive element (4) corresponding to the brightness of the object.

The correction resistor (15) makes approximate correction of the difference in the change of the film sensitivity between flash photography (FM) and AE photography. In AE photography, the change of the film sensitivity must be taken into account. For example, when the film sensitivity changed 1 step and the time change is to change ½ step, then the aperture opening must be changed ½ step, however, in flash photography, if the film sensitivity is changed 1 step, the aperture opening shall be changed 1 step.

As described hereinbefore, the shutter control system according to the present invention is capable of electrically introducing exposure information for flash photography, such as the object distance and the guide number, in case of flash photography and also capable of arithmetic operation combined with the film sensitivity setting. Furthermore, the system is capable of giving a warning indication when the result obtained from the exposure information exceeds the full aperture opening of the shutter. The system has an excellent voltage characteristic and temperature characteristic as the informations are introduced using a bleeder circuit consisting of a series of resistors.

We claim:

1. In a program shutter control circuit having a switching circuit connected to the output of a time constant integrating circuit comprised of a condenser and a photoconductive element, and an electromagnet connected to the output of said switching circuit for controlling the closing operation of the shutter: a shutter control system for setting the trigger level of said switching circuit as a voltage determined by the combination of a series of resistances for film sensitivity setting and a series of resistances for introducing exposure information for flash photography such as the object distance and the guide number.

2. A program shutter control circuit as set forth in claim 1, including means for providing a warning indication prior to photographing when the calculated aperture opening as determined from said film sensitivity setting and said exposure information exceeds the full aperture opening in the flash photography mode.

3. In an electric shutter control circuit operable in a flash photography mode and having an energizeable electromagnet for controlling the closing operation of the shutter, a switching circuit switchable between two switching states to control the energization of said electromagnet, and means for setting film sensitivity information and object distance information: means for variably setting the trigger level voltage at which said switching circuit switches from one switching state to another switching state in the flash photography mode as a function of both the film sensitivity setting and the object distance setting.

4. An electric shutter control circuit according to claim 3; wherein said means for variably setting the trigger level voltage comprises means for establishing a first resistance value corresponding to the film sensitivity setting, means for establishing a second resistance value corresponding to the object distance setting, and means for setting the trigger level voltage as a function of the arithmetic sum of said first and second resistance values.

5. An electric shutter control circuit according to claim 3 or 4; further including a time constant circuit comprised of a condenser and a photoconductive element for producing a timing signal voltage and for applying the timing signal voltage to said switching circuit to effect switching thereof from one switching state to another switching state.

6. An electric shutter control circuit according to claim 5; further including warning means for providing a warning signal prior to photographing in the event the timing signal voltage exceeds the trigger level voltage in the flash photography mode thereby indicating that the exposure time as determined by said film sensitivity and object distance settings is longer than the time during which the aperture is fully open in the flash photography mode.

7. An electric shutter control circuit according to claim 6; wherein said warning means comprises a warning indicator light connected to said switching circuit so as to be energized into emitting light to thereby provide said warning signal when the timing signal voltage exceeds the trigger level voltage.

* * * * *